R. B. D. WALKER.
POTATO HILLING PLOW.
APPLICATION FILED NOV. 26, 1913.
1,225,378.
Patented May 8, 1917.
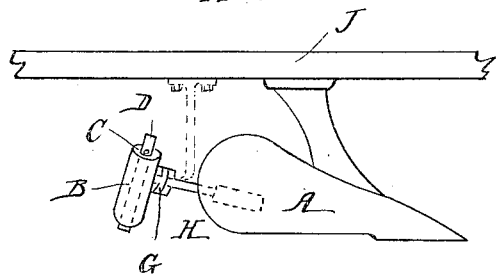
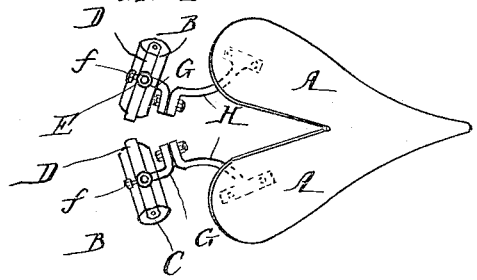
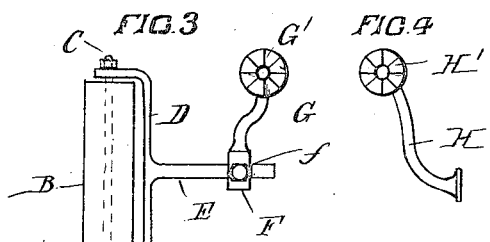 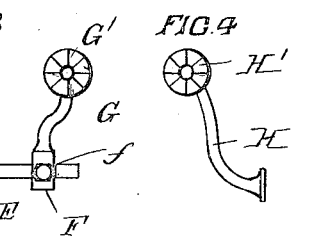
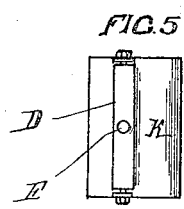 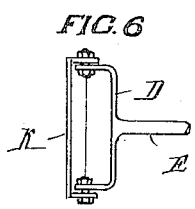

UNITED STATES PATENT OFFICE.

RUDOLPH BOSSERT DOCETTI WALKER, OF BLENHEIM, NEW ZEALAND.

POTATO-HILLING PLOW.

1,225,378.  Specification of Letters Patent.  Patented May 8, 1917.

Application filed November 26, 1913. Serial No. 803,303.

*To all whom it may concern:*

Be it known that I, RUDOLPH BOSSERT DOCETTI WALKER, subject of the King of Great Britain, residing at Blenheim, New Zealand, have invented a new and useful Improved Attachment to Potato-Hilling Plows; and I do hereby declare the following to be a full, clear, and exact description of the same.

This invention has been designed with the object of providing attachments to potato hilling plows by the use of which the sides of the hills or ridges are packed in a solid even manner. The packing of these surfaces will insure of the ridges retaining their forms and will in addition provide for rain falling upon them running off into the hollows between so as to be diverted from the tubers and in dry areas for the moisture being retained in the ridges. The formation of the ridges with the hard surfaces, will in addition, prevent any disease fungi lodging upon the tops and collected or engendered by the halms being washed through the ground into the tubers but will insure of such being washed down in to the hollows. The employment of the invention therefore to pack the surfaces will serve to lessen the liability of the potatoes to be attacked by blight and other diseases caused by excessive dampness in the ridges.

The invention consists in the combination with the hilling moldboards of the plow, of rollers, arranged one behind each moldboard, and adapted to rotate over the surfaces hilled by such moldboards so as to smooth them and press the earth down tightly. Each roller is so mounted that it may be adjusted in the angle of its axis in both the vertical and horizontal planes thereby providing for the faces of the hills being inclined at any desired degree, and for the rolling action being performed uniformly.

The rollers are made of the required length to extend across the sides of the hill or ridge and may be made of suitable material. They may be mounted by journaling each one upon a spindle extending longitudinally through the center of the roller and at its ends carried in a fork bearing having a stem that is fitted into a bracket upon the plow frame. The stem is adapted to rotate in the bracket so that the horizontal angle of the roller may be altered, and to slide up and down therein so that the height of the roller from the ground may be adjusted. The bracket is made capable of turning up or down so that the vertical angle assumed by the roller may be regulated. The roller bearings are also so attached to the respective moldboards as to move with the adjustment of the moldboards and thereby adjust the spread of the rollers to correspond with that of the moldboards.

If desired, the rollers may be replaced by flat sledge shaped plates having upwardly curved forward ends to allow of them sliding freely over the ridge surfaces. These plates also will be made capable of adjustment as to the angles assumed, in the same manner as the rollers are adjustable.

The invention is illustrated in the accompanying drawings, in which:—

Figure 1 is a side elevation of a share and moldboard with its roller attached thereto.

Fig. 2 is a plan of the same showing the two rollers arranged to pack the sides of the hollow through which the moldboard passes.

Fig. 3 is a detail view of the roller and its carrying arm.

Fig. 4 is an elevation of the arm for the attachment of the roller to the moldboard.

Figs. 5 and 6 are respectively plan and back end elevation of the sledge that may be substituted for the roller.

A are the two moldboards which are made to extend rearward from a common share point in any of the well known ways. B are the rollers one of which is arranged at the rear of each moldboard in such a position as to run over the surface of the ridge turned over by such moldboard. This is effected by mounting each roller upon a spindle C carried by the arms of a fork bracket D. The bracket is provided with a central stem E which passes through a boss F upon an arm G in such a manner as to be adjustable therein and to be secured at any desired point by means of a set screw *f*. This arm G is formed with a disk plate G' on its other end which is laid and fastened against a similar disk plate H' of a second arm H that is bolted either to the inside of the moldboard, as shown by the full lines in Figs. 1 and 2, or to the beam J of the plow as shown by the dotted lines in Fig. 1. A bolt disposed at *g* passes through the two disks G' and H' and fastens them together.

The arms G and H are so shaped and bent as to provide for the roller B being carried in the desired position at the back of the moldboard. The arm G may be turned to varying angles to position the roller at different inclines, by loosening the bolt disposed at g, and then fastened in its new position by tightening such bolt again. If desired the adjacent surfaces of the disks may be serrated, as shown in Figs. 3 and 4, to provide an effective grip between the two surfaces.

The adjustability of the bracket stem E in the boss F provides for the roller being moved in or out with respect to the surface of its ridge so that its distance from the ridge and the consequent degree of its pressure thereon may be regulated.

The sledge shown in Figs. 5 and 6 for use in substitution for the roller consists of the flat plate K having an upwardly curved forward edge and attached to the fork bracket D so that it may slide over the surface of the ridge and pack it down.

What I do claim as my invention and desire to secure by Letters Patent is:—

1. The combination with a plow having a mold board, of an arm fixed to said mold board and extending rearwardly therefrom, a second arm extending rearwardly from said first mentioned arm, a connection between said arms having means whereby said second mentioned arm may be angularly adjusted with respect to said first mentioned arm, a socket at the end of said second arm, a stem slidably mounted in said socket, and extending substantially at right angles to said second mentioned arm, means for holding said stem in adjusted position in said socket and a cylindrical roller mounted at the end of said stem.

2. The combination with a plow having a mold board, of an arm fixed to said mold board and extending rearwardly therefrom in a curve, a second arm extending rearwardly from said first-mentioned arm, a connection between said arms having means whereby said second-mentioned arm may be angularly adjusted with respect to said first-mentioned arm, a socket at the end of said second arm, a stem slidably mounted in said socket, and extending substantially at right angles to said second-mentioned arm, means for holding said stem in adjusted position in said socket and a cylindrical roller mounted at the end of said stem.

In testimony whereof, I have signed this specification in the presence of subscribing witnesses.

RUDOLPH BOSSERT DOCETTI WALKER.

Witnesses:
ANDREW CURRY,
H. E. BURDEN,
HENRY EDWARD BURDEN.

Copies of this patent may be obtained for five cents each, by addressing the " Commissioner of Patents, Washington, D. C."